(12) United States Patent
Justusson et al.

(10) Patent No.: US 11,379,628 B2
(45) Date of Patent: Jul. 5, 2022

(54) REINFORCED COMPOSITE STRUCTURE ANALYSIS SYSTEM

(71) Applicant: The Boeing Company, Chicago, IL (US)

(72) Inventors: Brian P. Justusson, St. Louis, MO (US); Joseph D. Schaefer, St. Louis, MO (US); Bryan W. Lilley, St. Louis, MO (US)

(73) Assignee: The Boeing Company, Chicago, IL (US)

(*) Notice: Subject to any disclaimer, the term of this patent is extended or adjusted under 35 U.S.C. 154(b) by 421 days.

(21) Appl. No.: 16/584,119

(22) Filed: Sep. 26, 2019

(65) Prior Publication Data

US 2021/0097150 A1    Apr. 1, 2021

(51) Int. Cl.
*G06F 30/15* (2020.01)
*B64D 45/00* (2006.01)
*G06F 30/17* (2020.01)

(52) U.S. Cl.
CPC ............ *G06F 30/15* (2020.01); *B64D 45/00* (2013.01); *G06F 30/17* (2020.01)

(58) Field of Classification Search
CPC .......... G06F 30/15; G06F 30/00; G06F 30/17; G06F 30/23; G06F 2113/36; B64D 45/00
USPC ....................................................... 703/8, 6
See application file for complete search history.

(56) References Cited

U.S. PATENT DOCUMENTS

| | | | | |
|---|---|---|---|---|
| 6,041,132 A * | 3/2000 | Isaacs | ................... | G01N 23/046 378/21 |
| 2014/0278292 A1* | 9/2014 | Grellou | .................... | G06F 30/15 703/2 |
| 2015/0185128 A1* | 7/2015 | Chang | ....................... | B64F 5/60 702/35 |
| 2016/0125107 A1* | 5/2016 | Druckman | .............. | G06F 30/23 703/2 |
| 2016/0193806 A1* | 7/2016 | Balabanov | ................ | B32B 5/02 428/113 |

* cited by examiner

*Primary Examiner* — Cedric Johnson
(74) *Attorney, Agent, or Firm* — Yee & Associates, P.C.

(57) ABSTRACT

A method, apparatus, and system for managing a composite structure. A set of component models is created for a set of components in the composite structure. A set of embedded reinforcement element models is placed within the set of component models for the set of components in the composite structure to form a composite structure model for the composite structure. The set of embedded reinforcement element models is for a set of embedded reinforcements embedded within the set of components in the composite structure. A structural analysis of the composite structure is performed using the composite structure model formed by the set of component models and the set of embedded reinforcement element models, wherein the set of embedded reinforcement element models enables modeling at least one of a deformation or a failure of embedded reinforcements.

30 Claims, 13 Drawing Sheets

REINFORCED COMPOSITE STRUCTURE ANALYSIS SYSTEM

BACKGROUND INFORMATION

1. Field

The present disclosure relates generally to a manufacturing system for composite structures and, in particular, to a method, apparatus, and system for analyzing composite structure designs for manufacturing composite structures.

2. Background

Composite materials have become widely used in the aircraft industry. Composite materials such as carbon fiber reinforced polymers (CFRPs) have a high strength-to-weight ratio as compared to metals such as aluminum and have a level of stiffness making these composite materials suitable for use to form aircraft structures. The structures include, for example, skin panels, stringers, ribs, wings, fuselage sections, passenger doors, floor boards, spars, frames, bulkheads, doublers, and other aircraft structures.

Computer-aided design (CAD) systems are commonly used in designing composite structures. These computer-aided design systems can create three-dimensional models of composite structures from which these models can be used to manufacture the composite structures. The computer-aided design models can be used to select designs for manufacturing or analysis. For example, these composite structures can be tested to determine the strength of the composite structures. The testing can be performed using the models of the composite structures. Both testing of physical composite structures and analysis of the models of the composite structures can be used to meet requirements and obtain certification of the composite structures for use in aircraft.

A three-dimensional model of a composite structure created using a computer-aided design system can be converted into a form from which the analysis of the strength, stiffness, and other performance of the composite structures can be determined. This analysis can take the form of a finite element analysis (FEA) on the finite element analysis model of the composite structure derived from the computer-aided design (CAD) model.

Current modeling and analysis of composite aircraft structures are not always as accurate as desired. As a result, testing of prototypes of aircraft structures is often performed in addition FEA analysis. The prototype testing is commonly used for airworthiness certification. This process can take more time than desired in finalizing a design of a composite aircraft structure for production and use in an aircraft.

Therefore, it would be desirable to have a method and apparatus that take into account at least some of the issues discussed above, as well as other possible issues. For example, it would be desirable to have a method and apparatus that overcome a technical problem with designing composite aircraft structures.

SUMMARY

A composite structure management system comprising a computer system and a composite structure manager in the computer system. During operation of the composite structure manager, the composite structure manager operates to create a set of component models for a set of components in a composite structure. The composite structure manager also operates to place a set of embedded reinforcement element models within the set of component models for the set of components in the composite structure. The set of component models and the set of embedded reinforcement element models form a composite structure model for the composite structure. The set of embedded reinforcement element models is for a set of embedded reinforcements embedded within the set of components in the composite structure, and the set of embedded reinforcement element models a response to a set of structural loads. The composite structure manager operates to perform a finite element analysis on the composite structure using the composite structure model formed by the set of component models and the set of embedded reinforcement element models.

Another embodiment of the present disclosure provides a computer system. The computer system is configured to create a set of component models for a set of components in a composite structure. The computer system is also configured to place a set of embedded reinforcement element models within the set of component models for the set of components in the composite structure. The set of component models and the set of embedded reinforcement element models form a composite structure model for the composite structure. The set of embedded reinforcement element models is for a set of embedded reinforcements embedded within the set of components in the composite structure. The computer system is configured to perform a structural analysis of the composite structure using the composite structure model formed by the set of component models and the set of embedded reinforcement element models.

Yet another embodiment of the present disclosure provides a method for managing a composite structure. A set of component models is created for a set of components in the composite structure. A set of embedded reinforcement element models is placed within the set of component models for the set of components in the composite structure to form a composite structure model for the composite structure. The set of embedded reinforcement element models is for a set of embedded reinforcements embedded within the set of components in the composite structure. A structural analysis of the composite structure is performed using the composite structure model formed by the set of component models and the set of embedded reinforcement element models, wherein the set of embedded reinforcement element models enables modeling at least one of a deformation or a failure of embedded reinforcements.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current techniques for analyzing performance of composite structures do not provide a desired level of accuracy in modeling nonconformances in composite structures. The illustrative embodiments recognize and take into account that current techniques for analyzing the performance of the composite structures do not provide a desired level of accuracy in modeling at least one of deformations or failures, such as an occurrence, a propagation, or both an occurrence and a propagation of nonconformances in composite structures. The nonconformances can be selected from at least one of a tear, a disbonding, a delamination, a separation of layers, a crack, or some other nonconformance that can occur in response to the application of a structural load on a composite structure.

The illustrative embodiments recognize and take into account that current techniques for analyzing the performance of composite structures do not provide a desired level of accuracy in modeling at an occurrence, a propagation, or both an occurrence and propagation of the nonconformances in the composite structures that include components such as reinforcement elements.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 1:
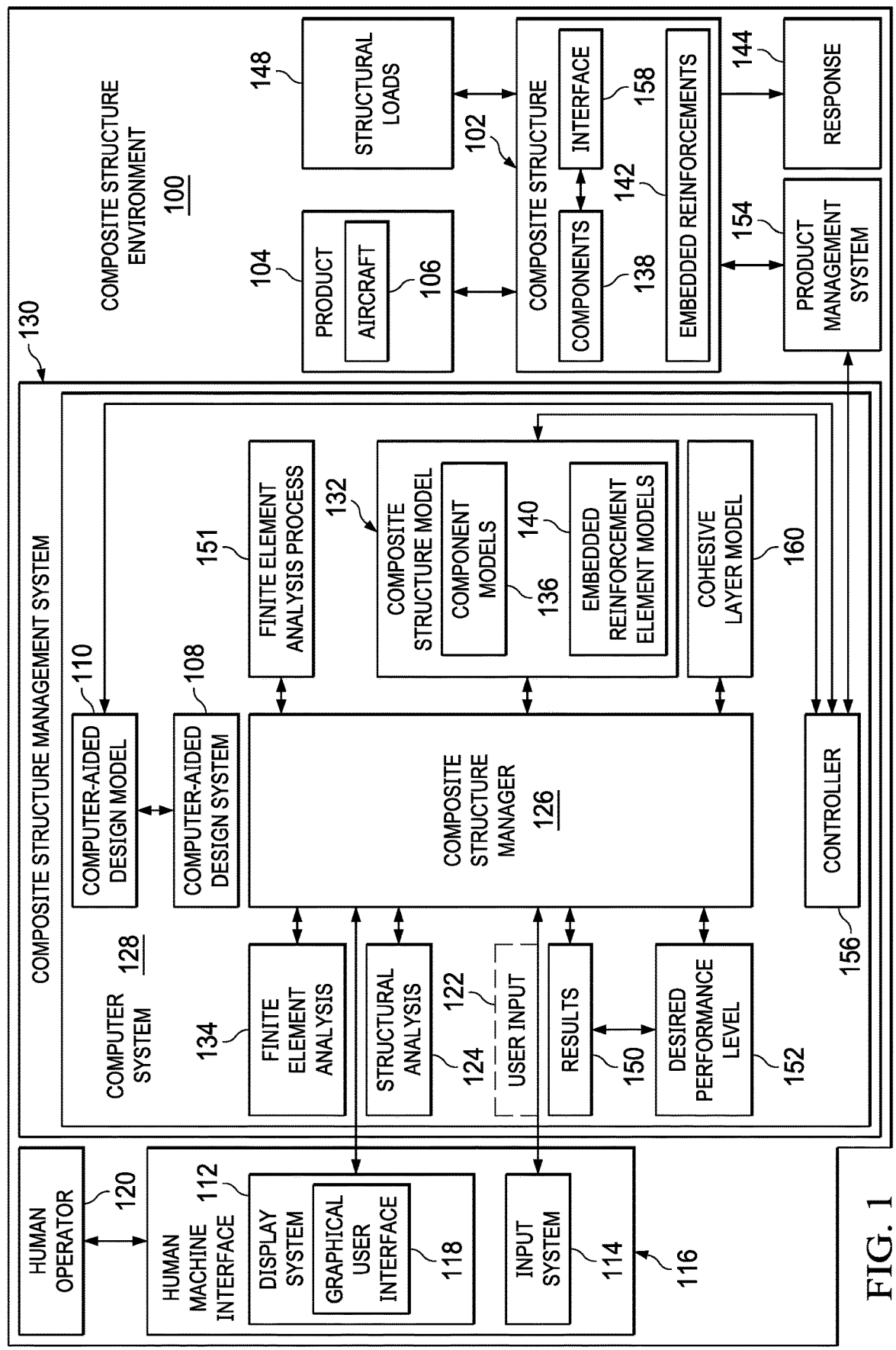
FIG. 1 is an illustration of a block diagram of a composite structure environment in accordance with an illustrative embodiment.

With reference to the figures and, in particular, with reference to FIG. 1, an illustration of a block diagram of a composite structure environment is depicted in accordance with an illustrative embodiment. In this illustrative example, composite structure environment 100 is an environment in which composite structure 102 is designed for use in product 104 such as aircraft 106.

In this illustrative example, product 104 can be selected from one of a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, a building, and some other suitable types of products in which composite structures are used. Composite structure 102 can take a number of different forms. For example, composite structure 102 can be a skin panel, a fairing, an engine housing, a stringer, a door, a wing, a panel, a skin panel, a composite stringer stiffened panel, a frame, a doubler, a spar, or other suitable types of composite structures.

As depicted, the structural geometry for composite structure 102 can be designed using computer-aided design system 108 to produce computer-aided design model 110 for composite structure 102. Computer-aided design system 108 comprises hardware and software components. As depicted, human operator 120 interacts with computer-aided design system 110 to generate computer-aided design model 110 for composite structure 102.

In this illustrative example, the interaction with computer-aided design system 108 is facilitated by display system 112 and input system 114, which are part of human machine interface 116. Display system 112 is a physical hardware system and includes one or more display devices in which graphical user interface 118 can be displayed. In this example, a visualization of computer-aided design model 110 for composite structure 102 can be displayed in graphical user interface 118 in display system 112.

The display devices in display system 112 can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

Human operator 120 is a person that can interact with graphical user interface 118 through user input 122 generated by input system 114. As depicted, input system 114 is a physical hardware system and can be selected from at least one of a mouse, a keyboard, a trackball, a touchscreen, a stylus, a motion sensing input device, a cyber glove, or some other suitable type of input device.

In this illustrative example, computer-aided design system 108 can include software selected from at least one of Solidworks available from Dassault Systemes SE, Catia available from Dassault Systemes SE, AutoCAD available from Autodesk, Inc., NX available from Siemens Product Lifecycle Management Software Inc., CREO available from PTC, Inc., Abaqus/CAE available from Dassault Systemes, Hyperworks available from Altair Engineering, Inc., LS-DYNA available from Livermore Software Technology Corporation (LSTC), or other suitable software products.

Computer-aided design model 110 is a three-dimensional model of composite structure 102 that can be visually displayed by computer-aided design system 108 on graphical user interface 118 in display system 112. In this illustrative example, computer-aided design model 110 comprises three-dimensional technical drawings and can also include information selected from at least one of a material, a process for manufacturing, a dimension, a tolerance, or other suitable information about composite structure 102.

As depicted, structural analysis 124 can be performed for composite structure 102 prior to fabricating composite structure 102. Structural analysis 124 is a determination of the effects of loads on physical structures and their components. In this example, the physical structure is composite structure 102. In this illustrative example, structural analysis 124 can be performed by composite structure manager 126 in computer system 128. These two components form composite structure management system 130.

Composite structure manager 126 can be implemented in software, hardware, firmware, or a combination thereof. When software is used, the operations performed by composite structure manager 126 can be implemented in program code configured to run on hardware, such as a processor unit. When firmware is used, the operations performed by composite structure manager 126 can be implemented in program code and data and stored in persistent memory to run on a processor unit. When hardware is employed, the hardware can include circuits that operate to perform the operations in composite structure manager 126.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 128 is a physical hardware system and includes one or more data processing systems. When more than one data processing system is present in computer system 128, those data processing systems are in communication with each other using a communications medium. The communications medium can be a network. The data processing systems can be selected from at least one of a computer, a server computer, a tablet computer, or some other suitable data processing system.

As depicted, computer-aided design model 110 can be converted into composite structure model 132 by at least one of computer-aided design system 108 or composite structure manager 126. In this illustrative example, composite structure model 132 is in a form such that structural analysis 124 in the form of finite element analysis (FEA) 134 can be performed on composite structure 102 using composite structure model 132 for composite structure 102.

In this illustrative example, composite structure manager 126 operates to create a set of component models 136 for a set of components 138 in composite structure 102. As used herein, a "set of," when used with reference to items means one or more items. For example, a "set of component models 136" is one or more of component models 136.

Composite structure manager 126 also operates to place a set of embedded reinforcement element models 140 within the set of component models 136 for the set of components 138 in composite structure 102. The set of component models 136 and the set of embedded reinforcement element models 140 form composite structure model 132 for composite structure 102.

As depicted, the set of embedded reinforcement element models 140 is for a set of embedded reinforcements 142 embedded within the set of components 138 in composite structure 102. Embedded reinforcements 142 can be assigned any angle, direction, architecture, or interaction as desired for analysis.

In this illustrative example, composite structure model 132 is a mesh comprised of elements that form the shape of composite structure 102. Components 138 within composite structure 102 are defined by the elements and their interconnections at nodes. In the illustrative example, the elements can be three-dimensional elements. These elements can include at least one of a tetrahedral element, a pentahedral element, a hexahedral element, a four-node tetrahedral element, a ten-node tetrahedral element, a three-node shell element, or other suitable types of elements currently used in finite element analysis.

The elements forming the mesh have properties such as an orientation, a thickness, a coefficient of expansion, a density, a Young's modulus, a shear modulus, a Poisson's ratio, and other suitable properties.

The set of embedded reinforcement element models 140 models response 144 to a set of structural loads 148. In other words, the set of embedded reinforcement element models 140 represents or imitates the response of a physical embedded reinforcement to the set of structural loads 148. As depicted, the set of structural loads 148 is one or more structural loads 148. The set of structural loads 148 can be a load on composite structure 102 in which the set of structural loads 148 has a range of values applied at different times. In another example, each structural load in the set of structural loads 148 can have the same value applied over time.

In this illustrative example, set of structural loads 148 are selected from at least one of a force, a deformation, a temperature, a displacement, a velocity, or an acceleration applied to composite structure 102. The structural loads in the set of structural loads 148 can be simulated through finite element analysis 134 performed on composite structure model 132 for composite structure 102, which has a format that is suitable for performing finite element analysis 134.

In this illustrative example, finite element analysis 134 can be formed using a number of different finite element analysis processes that implement numerical methods for solving engineering and mathematical physics problems. For example, finite element analysis 134 can be performed by finite element analysis process 151 which can be one of Abaqus/CAE, Abaqus/Standard, and Abaqus/Explicit, which are available from Dassault Systemes SE. As another example, finite element analysis process 151 can be implemented using ANSYS Mechanical Enterprise which is available from ANSYS, Inc.

In one illustrative example, composite structure 102 comprises a skin panel and a number of stringers, wherein the set of component models 136 for composite structure 102 comprises a number of stringer models for the number of stringers and a skin panel model of the skin panel. The set of embedded reinforcement element models 140 can be for a set of embedded reinforcements 142 selected from at least one of a z-axis reinforcement, a stitch, a pin, a fastener, or some other suitable type of reinforcement. In the depicted example, the set of embedded reinforcements 142 can be used in any orientation desired.

The particular embedded reinforcement 142 can be selected as one that reinforces the connection between two of components 138 in composite structure 102. For example, embedded reinforcements 142 can be a reinforcement between a stringer and a skin panel. These embedded reinforcements can also be used as reinforcements between a skin panel and a doubler, a doubler and a pad-up in a door frame, a tear strap a panel, or other components.

In this illustrative example, composite structure manager 126 also operates to perform finite element analysis 134 on composite structure 102 using composite structure model 132. As depicted in the illustrative example, composite structure model 132 comprises the set of component models 136 and the set of embedded reinforcement element models 140. In the illustrative example, the set of embedded reinforcement element models 140 enables modeling at least one of a deformation or a failure of embedded reinforcement 142.

As depicted, composite structure manager 126 generates results 150 from finite element analysis 134 of composite structure model 132. Results 150 can indicate whether the analysis of composite structure 102 using composite structure model 132 meets desired performance level 152. In this illustrative example, desired performance level 152 can be determined in a number of different ways. For example, desired performance level 152 can be based on at least one of a standard, manufacturer specifications, federal aviation administration (FAA) regulations, certification requirements, or other suitable sources for selecting or setting desired performance level 152.

As depicted, composite structure manager 126 can adjust the set of embedded reinforcement element models 140 placed within the set of component models 136 for the set of components 138 when results 150 of finite element analysis 134 indicate that composite structure 102 does not meet desired performance level 152. In this illustrative example, the adjustment can be made by human operator 120 interacting with composite structure manager 126 through human machine interface 116.

In the illustrative example, the adjustment can be made to a single embedded reinforcement element model or to multiple embedded reinforcement element models in embedded reinforcement element models 140. The adjustment can be changing at least one of the number of embedded reinforcement element models 140 within the component models, an orientation of embedded reinforcement element models 140 within the component models, a location of an embedded reinforcement element model, an orientation of an embedded reinforcement element model within the component models, or other suitable changes to one or more of embedded reinforcement element models 140 within component models 136 for composite part 102.

Composite structure model 132 with adjustments can be analyzed again using finite element analysis 134 to determine whether composite structure model 132 meets desired performance level 152. When results 150 of finite element analysis 134 of composite structure model 132 meet desired performance level 152, composite structure 102 can be manufactured.

For example, composite structure management system 130 can include controller 156. In this illustrative example, controller 156 is configured to control the manufacturing of composite structure 102 and product management system 154. Controller 156 can control the manufacturing of composite structure 102 using at least one of composite structure model 132 or computer-aided design model 110 of composite structure 102. When computer-aided design model 110 is used, computer-aided design model 110 is updated with any adjustments or changes made to composite structure model 132. For example, the adjustments made to one or more of embedded reinforcement element models 140 in composite structure model 132 are also updated in computer-aided design model 110 such that computer-aided design model 110 can be used by controller 156 to control product management system 154 to manufacture composite structure 102. The control of product management system 154 can be performed by controller 156 sending commands, program code, data, models, or other information to product management system 154.

In another illustrative example, interface 158 between components 138 can also be modeled by composite structure manager 126. As depicted, interface 158 is modeled using cohesive layer model 160. Cohesive layer model 160 describes the behavior of how two components in components 138, with interface 158 between the two components, behave in response to structural loads 148.

For example, interface behavior modeled by cohesive layer model 160 can be modeled as simple frictional contact or as a fracture-based approach in a virtual crack closure technique, which can be used to detect cracks. In this illustrative example, crack closure is a phenomenon in fatigue loading, where the opposing faces of a crack remain in contact even with an external load, such as structural loads 148, acting on the material.

As the structural load increases, a critical value will be reached at which time the crack becomes open. Crack closure occurs from the presence of a material propping open crack faces and can arise from many sources including plastic deformation or phase transformation during crack propagation, corrosion of cracked surfaces, presence of fluids in the crack, or roughness at a cracked surface.

In this depicted example, cohesive layer model 160 can be used in cases where the components share a material interface such as a resin-rich area or an adhesive. Sliding contact can be modeled by cohesive layer model 160 in the case where reinforcement is between two dissimilar materials where adhesive or other material is absent such as the case of a composite joined to a metal.

As depicted, cohesive layer model 160 can be used with embedded reinforcement element models 140 for analyzing response 144 of composite structure 102 to a set of structural loads 148. User input 122 can be received from human machine interface 116 to place embedded reinforcement element models 140 for embedded reinforcements 142 within component models 136 for components 138 in composite structure model 132 for composite structure 102. The reinforcement strategy can be made by a designer, such as human operator 120, to determine how and where embedded reinforcements 142 are located. The reinforcement strategy can include different types of embedded reinforcements 142.

Figure 2:
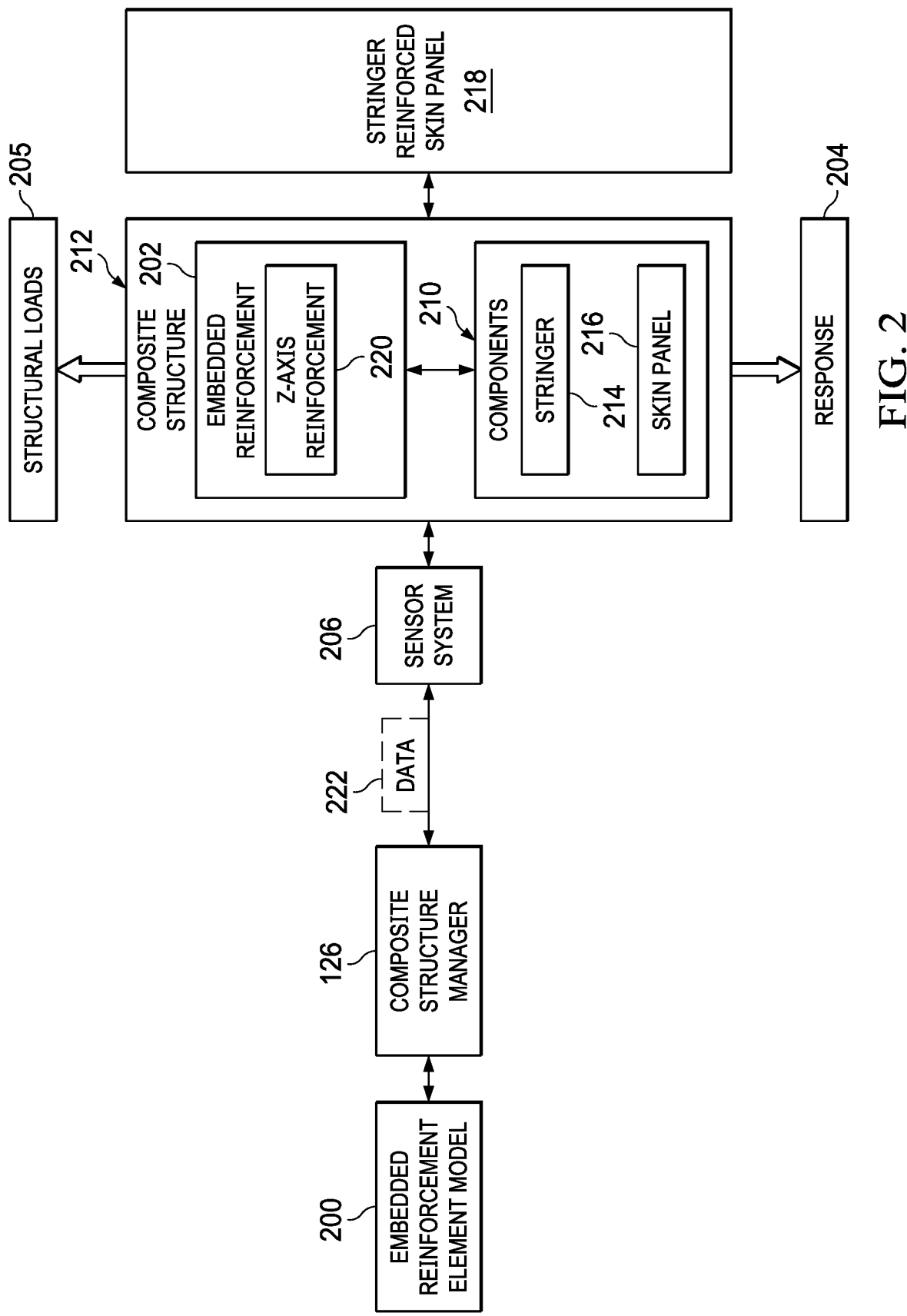
FIG. 2 is an illustration of a dataflow for creating an embedded reinforcement element model in accordance with an illustrative embodiment.

With reference next to FIG. 2, an illustration of a dataflow for creating an embedded reinforcement element model is depicted in accordance with an illustrative embodiment. In this illustrative example, embedded reinforcement element model 200 is an example of a model in embedded reinforcement element models 140 in FIG. 1. As depicted, embedded reinforcement element model 200 is a model of embedded reinforcement 202 in embedded reinforcements 142 in FIG. 1.

As depicted, embedded reinforcement element model 200 models response 204 of embedded reinforcement 202 to a set of structural loads 205. In this illustrative example, embedded reinforcement element model 200 can define properties of a reinforcement. These properties can include, for example, a coefficient of expansion, a density, a Young's modulus, a shear modulus, a Poisson's ratio, and other suitable properties. These properties can be used to generate reinforcement elements that are placed into a mesh. Further, embedded reinforcement element model 200 can also include other information such as dimensions for the reinforcement. The dimensions can include cross-sectional areas.

In this illustrative example, sensor system 206 operates to detect response 204 of a set of structural loads 205 placed on embedded reinforcement 202 in components 210 in composite structure 212. For example, components 210 can include stringer 214 performed on skin panel 216 for composite structure 212 in the form of stringer reinforced skin panel 218. As depicted, embedded reinforcement element model 200 can be z-axis reinforcement 220. In this illustrative example, z-axis reinforcement 220 comprises reinforcing fibers that are placed through skin panel 216 and through stringer 214.

As depicted, sensor system 206 generates data 222 from detecting a set of structural loads 205 applied to embedded reinforcement 202, z-axis reinforcement 220, and through skin panel 216 and stringer 214. In this illustrative example, data 222 is generated by sensor system 206 over time while the set of structural loads 205 is applied.

In this illustrative example, sensor system 206 can be selected from at least one of a computed tomography (CT) scanner, an electron-beam computed tomography scanner, an in situ x-ray computed tomography scanner, a time-lapse x-ray computed tomography scanner, a continuous streaming x-ray computed tomography scanner, a positron emission tomography scanner, a single photo emission computer tomography scanner, or other types of sensors that are capable of generating data about response 204 of embedded reinforcement 202 to a set of structural loads 205.

For example, sensor system 206 can generate data 222 that captures nonconformances such as at least one of a deformation or a failure of embedded reinforcement 202 from applying the set of structural loads 205. The failure can include at least one of a disbonding, a delamination, a crack formation, a tear, a rupture, a tear, or an appearance of some other undesired nonconformance.

In this illustrative example, composite structure manager 126 is configured to generate embedded reinforcement element model 200 using data 222 generated by sensor system 206. As depicted, data 222 includes information about the appearance and progression of a deformation or failure in embedded reinforcement 202. In this manner, response 204 to a set of structural loads 205 over time can be modeled. Further, response 204 to the set of structural loads 205 that change can also be modeled. For example, data 222 can capture response 204 to an increase in a structural load.

For example, in this illustrative example, when sensor system 206 includes a computed tomography scanner, data 222 can be a computed tomography scan. Structural loads 205 can be applied while the computed tomography scanner scans composite structure 212. Various low levels may be used in structural loads 205 over time in different loading directions. For example, structural loads 205 can be in directions that cause at least one of tension, compression, or shear with various levels to cause a nonconformance such as a deformation or failure in embedded reinforcement 202.

As depicted, the state of the deformation or failure can be visualized with the computed tomography scan. The location and extent of these nonconformances can be compared to the global force displacement that occurs in response to structural loads 205. This comparison can be used by composite structure manager 126 to generate embedded reinforcement element model 200. This model is a material model for use in finite element analysis 134 in FIG. 1.

Embedded reinforcement element model 200 can be determined from a closed form solution or, in terms of tabular, the data that is used to form embedded reinforcement element model 200. In one illustrative example, embedded reinforcement element model 200 is implemented as a subroutine that works with a native finite element (FE) solver. This solver is an example of finite element analysis process 151 in FIG. 1 which can be, for example, Abaqus/CAE, Abaqus/Standard, or Abaqus/Explicit.

Thus, embedded reinforcement 202 can be assigned a material property that includes embedded reinforcement element model 200 and a cross-sectional area in which embedded reinforcement element model 200 is applicable. While finite element analysis process 151 considers the cross-sectional area, embedded reinforcement 202 is not explicitly modeled. In other words, embedded reinforcement 202 does not interact with the host component, such as stringer 214 or skin panel 216.

This type of modeling reduces the need to model embedded reinforcements in which contacts between the embedded reinforcements and other components are modeled and analyzed with a discrete model. As a result, the amount of processing resources needed to analyze structural loads on a composite structure with embedded reinforcements can be reduced using this type of modeling. In other illustrative examples, this type of discrete model can be made with the reinforcement element models of the embedded reinforcements in the different illustrative examples.

Embedded reinforcement element model 200 can be any lower order component inserted in a host component. For example, when embedded reinforcement element model 200 is a truss, embedded reinforcement element model 200 is a one-dimensional element model that can handle axial loads. When embedded reinforcement element model 200 is of a beam, embedded reinforcement element model 200 is a two-dimensional element model that handles transverse loads. Because of the types of reinforcements, any reinforcement can be idealized as one of these types of elements. For example, a Z-pin field could be modeled as a field of one-dimensional embedded truss elements to represent the response for these embedded reinforcements. This type of representation can also reduce the amount of processing resources needed.

In the illustrative example, a predictive capability is provided with the use of embedded reinforcement element model 200 to model embedded reinforcement 202. Embedded reinforcement element model 200 captures the mechanics of the embedded reinforcement 202 that is absent in current analysis techniques. Current approaches for modeling reinforced interfaces rely on test data. Since the reinforcement strategy is intended to be designed, there is essentially an infinite design space for reinforcement strategies. Embedded reinforcement element model 200 allows for prediction of the properties that would be used with legacy approaches. With current techniques, every type of reinforcement strategy requires actual test data. With the use of embedded reinforcement element model 200, response to structural loads can be predicted.

Thus, the collection of data 222 characterizes the behavior of hidden reinforcement element behavior within the host composite structure while the host structure is under load. Data 222 can be used in the generation of a mathematical model, such as embedded reinforcement element model 200 through engineering mechanics to provide an ability to describe the behavior of these embedded reinforcements in a manner that can be more accurate as compared to current techniques which do not model the actual embedded reinforcements in a manner that provides an ability to model the response of these embedded reinforcements to a set of structural loads.

In one illustrative example, one or more technical solutions are present that overcome a technical problem with designing composite aircraft structures. As a result, one or more technical solutions can provide a technical effect of enabling analysis of designs of composite structures containing embedded reinforcements more quickly and efficiently as compared to current techniques. The illustrative example enables reducing the need to produce prototypes of the composite structures for structural load testing through improved models for analyzing composite structures using structural analysis.

Further, the illustrative examples can also enable determining crack tip locations at an interface with a desired level of accuracy. The crack tip is where a crack starts or originates in a composite structure. The illustrative example can also be applied to identify locations for a delamination, a disbonding, or other nonconformances in addition to or in place of identifying where the crack starts. The level of accuracy can be such that the modeling can be used in designing composite structures for certification. In the illustrative example, current certification practices often require no-growth or no-detrimental damage growth of cracks. Knowing at least one of the location of the crack tip at the interface between two materials, how that crack tip progresses into a region reinforced with reinforcement elements, or how far the crack tip can progress within that reinforced region before structural failure occurs can be useful in the certification process. The use of embedded reinforcement element models 140 in the illustrative examples can be used to identify locations for embedded reinforcements 142 to reinforce components 138 in composite structure 102 that can enable certification of composite structure 102 by the analysis performed.

Computer system 128 can be configured to perform at least one of the steps, operations, or actions described in the different illustrative examples using software, hardware, firmware, or a combination thereof. As a result, computer system 128 operates as a special purpose computer system in which composite structure manager 126 in computer system 128 enables designing composite structures with embedded reinforcements that have a desired level of performance with greater efficiency and less time as compared to current techniques used to design composite structures. In particular, composite structure manager 126 transforms computer system 128 into a special purpose computer system as compared to currently available general computer systems that do not have composite structure manager 126.

In the illustrative example, the use of composite structure manager 126 in computer system 128 integrates processes into a practical application for managing composite structures that increase the performance of computer system 128. In other words, composite structure manager 126 in computer system 128 is directed to a practical application of processes integrated into composite structure manager 126 in computer system 128 that enable a more accurate analysis of how a composite structure with embedded reinforcements responds to structural loads. In this illustrative example, composite structure manager 126 in computer system 128 creates a set of component models for a set of components in the composite structure; places a set of embedded reinforcement element models within the set of component models for the set of components in the composite structure to form a composite structure model for the composite structure in which the set of component models and the set of embedded reinforcement element models form a composite structure model for the composite structure, wherein the set of embedded reinforcement element models is for a set of embedded reinforcements embedded within the set of components in the composite structure; and performs a structural analysis of the composite structure using the composite structure model formed by the set of component models and the set of embedded reinforcement element models, wherein the set of embedded reinforcement element models enables modeling at least one of a deformation or a failure of embedded reinforcements.

As compared to current techniques, the results of the structural analysis are more accurate and use less computer processing resources to provide a desired level of accuracy as to how a composite structure with embedded reinforcements will respond to structural loading. With this analysis technique in the illustrative example, changes can be made to the number, location, and orientation of embedded reinforcements more quickly to obtain a desired performance for a composite structure. Thus, composite structure management system 130 operates as a reinforced composite structure analysis system to analyze designs of composite structures with reinforcements as well as enables updating designs to increase the performance of composite structures.

The illustration of composite structure environment 100 in FIGS. 1 and 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although computer-aided design system 108 is shown as a separate component from composite structure management system 130, this component can be included as part of composite structure management system 130. As another example, structural analysis 124 may include other analysis techniques in addition to finite element analysis 134. For example, structural analysis 124 can comprise at least one of finite element analysis 134, a static linear analysis, a dynamic linear analysis, a nonlinear static analysis, a buckling analysis, a P-delta analysis, a time-history analysis, or some other suitable technique that can be used for structural analysis 124.

Figure 3:
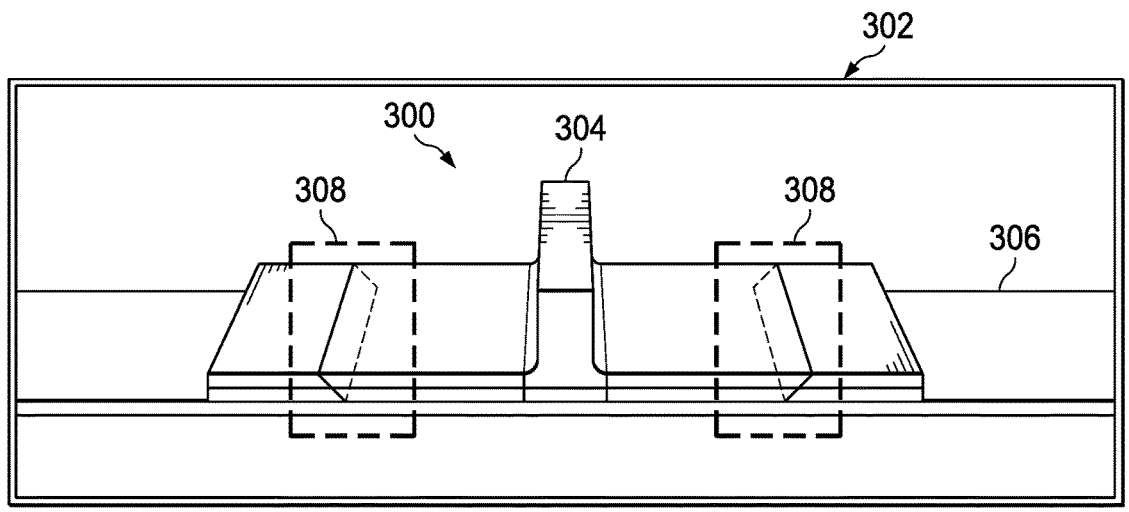
FIG. 3 is an illustration of a screen displaying embedded reinforcements in a composite structure in accordance with an illustrative embodiment.
Figure 4:
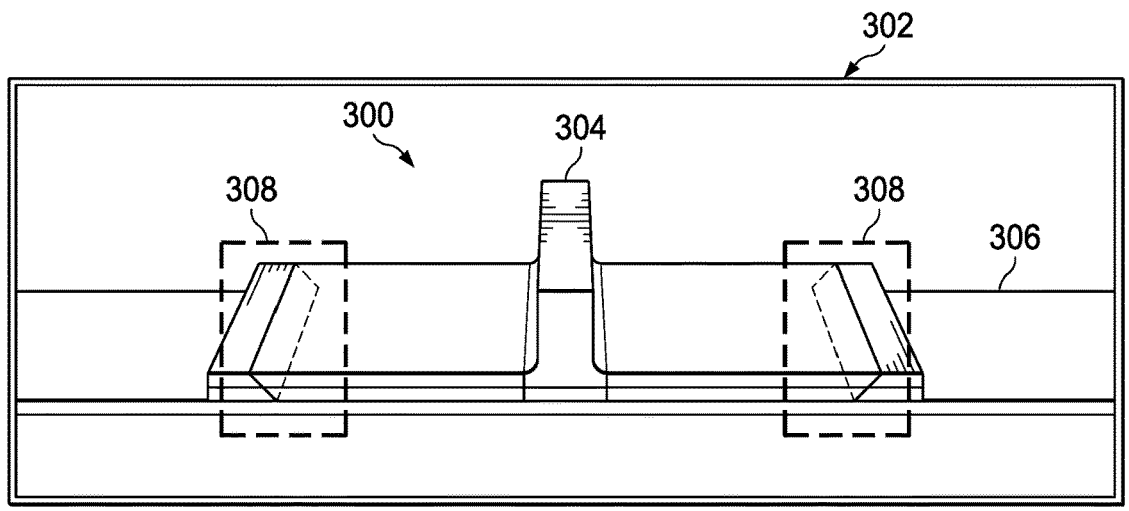
FIG. 4 is another illustration of a screen displaying embedded reinforcements in a composite structure in accordance with an illustrative embodiment.
Figure 5:
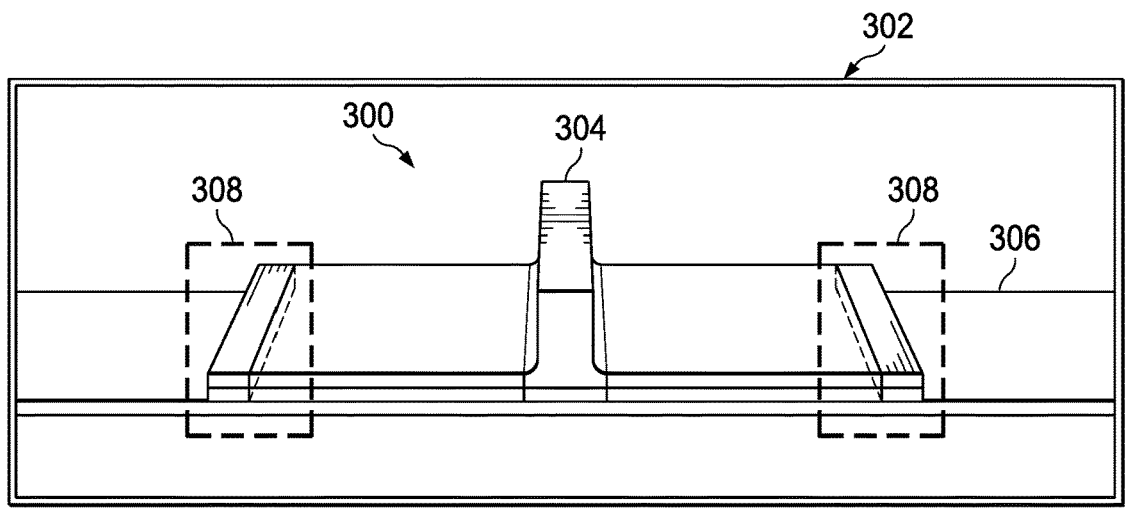
FIG. 5 is yet another illustration of a screen displaying embedded reinforcements in a composite structure in accordance with an illustrative embodiment.

Turning to FIGS. 3-5, an illustration of a screen displaying a composite structure with embedded reinforcements in different locations is depicted in accordance with an illustrative embodiment. As depicted in FIG. 3, an illustration of a screen displaying embedded reinforcements in a composite structure is displayed in accordance with an illustrative embodiment. Composite structure 300 displayed on screen 302 is an example of a visualization of composite structure 102 generated from composite structure model 132 in FIG. 1. Screen 302 is an example of a display in graphical user interface 118 displayed on display system 112 in human machine interface 116 in FIG. 1.

In this illustrative example, composite structure 300 comprises stringer 304 and skin panel 306. In this illustrative example, stringer 304 and skin panel 306 are examples of components 138 which are visualized using component models 136 and composite structure model 132 in FIG. 1.

As depicted, embedded reinforcements 308 are shown in a mid-flange location extending through these two components at a 45 degree angle. Embedded reinforcements 308 are visualized on screen 302 using models for finite element analysis such as embedded reinforcement element models 140 in FIG. 1. Embedded reinforcements 308 are examples of embedded reinforcements 142 in FIG. 1.

Turning next to FIG. 4, another illustration of a screen displaying embedded reinforcements in a composite structure is displayed in accordance with an illustrative embodiment. In this figure, embedded reinforcements 308 are shown in an end of a flange location at a 45 degree angle.

In FIG. 5, yet another illustration of a screen displaying embedded reinforcements in a composite structure is displayed in accordance with an illustrative embodiment. In this figure, embedded reinforcements 308 are shown in the end of a flange location at a 90 degree angle.

In this illustrative example, embedded reinforcement element models 140 for embedded reinforcements 308 can be placed in component models 136 for embedded reinforcements 142 as part of the generation of a composite structure model containing a mesh with elements for the different components. Displacement can be based on user input generated by a human operator operating a human machine interface.

In other illustrative examples, embedded reinforcements 308 can be placed in stringer 304 and skin panel 306 during creation of a computer-aided design model of composite structure 300 using a computer-aided design system. The embedded reinforcement element models can be automatically placed into the component models when the computer-aided design model is converted into a composite structure model for processing by finite element analysis process.

The illustrations of locations for embedded reinforcements 308 displayed on screen 302 in FIGS. 3-5 are provided for purposes of illustrating one manner in which a result can be displayed. These illustrations are not meant to limit the manner in which embedded reinforcements 308 are placed in composite structure 300 in other illustrative examples.

For example, other numbers of embedded reinforcements 308 can be placed in composite structure 300. Also, different types of embedded reinforcements 308 can be used. For example, embedded reinforcements 308 can include stitches and fasteners. Further, other illustrative examples can use other types of composite structures such as a frame and a skin panel, a spar and a skin panel, or other components.

Figure 6:
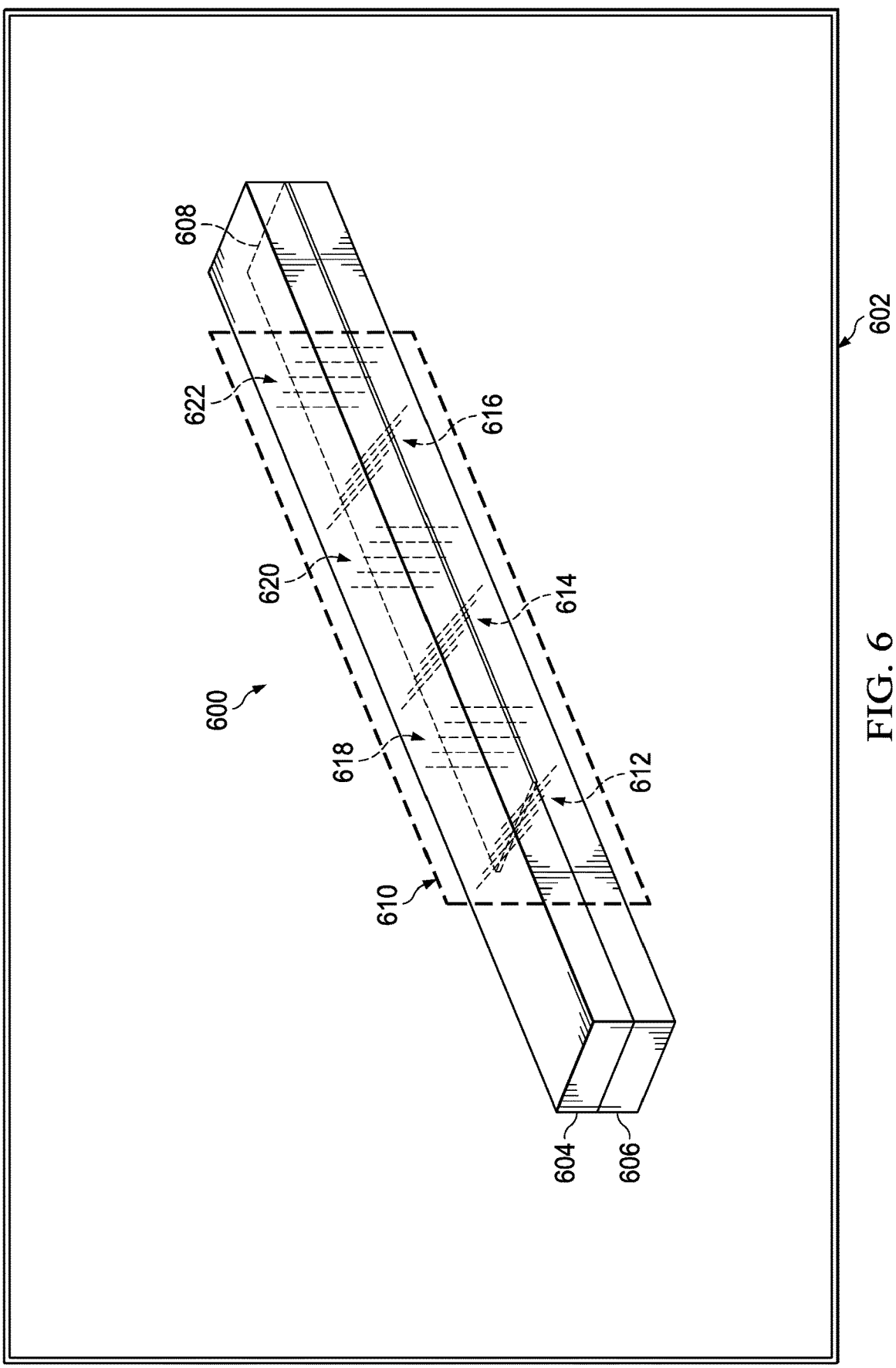
FIG. 6 is an illustration of a screen displaying a composite structure in accordance with an illustrative embodiment.
Figure 7:
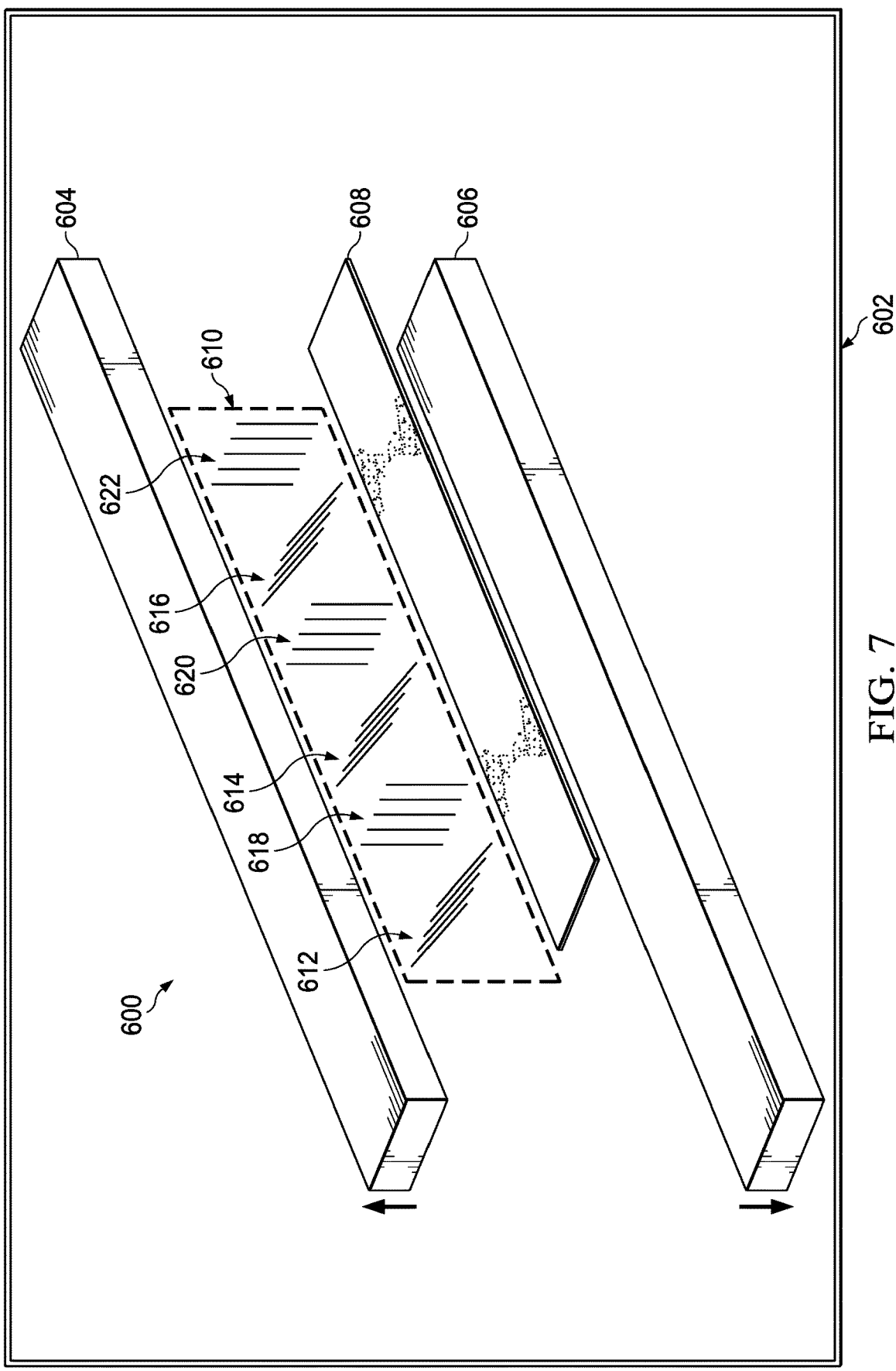
FIG. 7 is an illustration of a screen displaying an exploded view of a composite structure in accordance with an illustrative embodiment.
Figure 8:
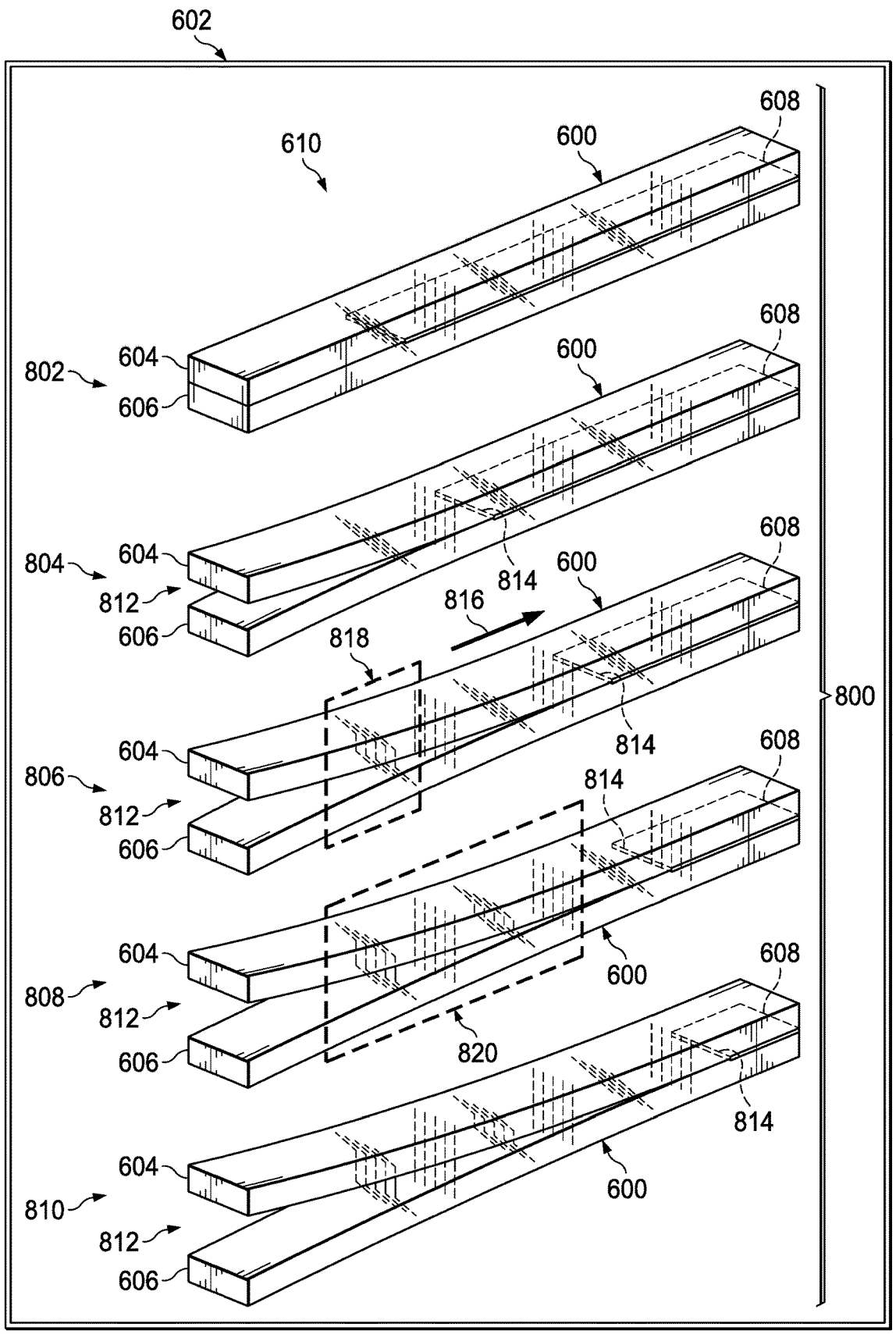
FIG. 8 is an illustration of a screen displaying a result from a finite element analysis of a composite structure in accordance with an illustrative embodiment.

With reference next to FIGS. 6-8, an illustration of a screen displaying a result of applying a set of loads to a composite structure is depicted in accordance with an illustrative embodiment. As depicted in FIG. 6, an illustration of a screen displaying a composite structure is displayed in accordance with an illustrative embodiment. Composite structure 600 displayed on screen 602 is an example of a visualization of composite structure 102 generated from composite structure model 132 in FIG. 1. Screen 602 is an example of a display in graphical user interface 118 displayed on display system 112 in human machine interface 116 in FIG. 1.

In this illustrative example, screen 602 can be displayed during post-processing in which a result of a finite element analysis is displayed as a visual rendering. In this illustrative example, composite structure 600 includes component 604 and component 606. Cohesive layer 608 located between component 604 and component 606.

In this illustrative example, component 604 and component 606 are a visualization of component models within a composite structure model, such as composite structure model 132 in FIG. 1. Cohesive layer 608 is a visualization of cohesive layer model 160 in FIG. 1.

As depicted, stitches 610 are examples of embedded reinforcements and extend through component 604, cohesive layer 608, and component 606. In this example, portion 612, portion 614, and portion 616 of stitches 610 are 45 degree stitches, and portion 618, portion 620, and portion 622 of stitches 610 are 90 degree stitches.

In this illustrative example, stiches 610 are a visualization generated from embedded reinforcement element models. As depicted in this illustration, embedded reinforcements can be at different locations and positions with respect to other reinforcements in screen 302.

With reference next to FIG. 7, an illustration of a screen displaying an exploded view of a composite structure is depicted in accordance with an illustrative embodiment.

Turning now to FIG. 8, an illustration of a screen displaying a result from a finite element analysis of a composite structure is depicted in accordance with an illustrative embodiment. In this illustrative example, screen 602 displays a result of performing a finite element analysis on composite structure 600 shown in FIG. 6 and FIG. 7.

In this illustrative example, the results displayed in screen 602 comprise states 800 for composite structure 600. As depicted, states 800 include state 802, state 806, state 806, state 808, and state 810. In this illustrative example, the visualization of this composite structure shows the progression of crack 812 between the different states as one or more structural loads are applied to composite structure 600 in the finite element analysis process.

In state 802, all of stitches 610 are intact. In state 804, a visualization of crack 812 resulting from a structural load is shown with crack tip 814. In state 806, crack tip 814 has progressed in the direction of arrow 816, and stitches 610 have failed as can be seen from the deformations in portion 818.

Next, in state 808, crack tip 814 has progressed further in the direction of arrow 816 as compared to state 806. In this state, portion 820 of stitches 610 has failed. In state 810, crack tip 814 has progressed even further in the direction of arrow 816 as compared to state 806. In this state, all of stitches 610 have failed.

The illustrations of screen 602 in FIGS. 6-8 are provided for purposes of illustrating one manner in which a result can be displayed. These illustrations are not mean to limit the manner in which a result can be displayed in other illustrative examples.

For example, a video or animation of the progression of crack 812 and the failure of stitches 610 can be shown in place of or in addition to displaying the states. In other illustrative examples, other information can also be displayed such as a value for the structural load being applied, the amount of time elapsed, a graphical indicator graphically identifying a location of the structural load or loads, and other suitable information.

Figure 9:
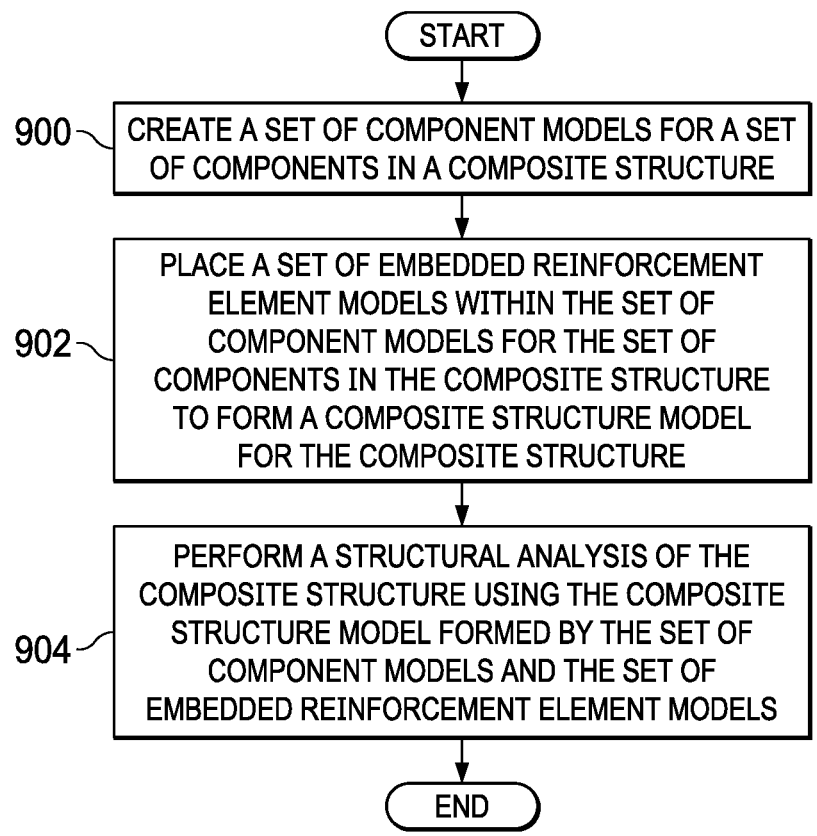
FIG. 9 is an illustration of a flowchart of a process for managing a composite structure in accordance with an illustrative embodiment.

Turning next to FIG. 9, an illustration of a flowchart of a process for managing a composite structure is depicted in accordance with an illustrative embodiment. The process in FIG. 9 can be implemented in hardware, software, or both. When implemented in software, the process can take the form of program code that is run by one of more processor units located in one or more hardware devices in one or more computer systems. For example, the process can be implemented in composite structure manager 126 in computer system 128 in FIG. 1.

The process begins by creating a set of component models for a set of components in a composite structure (operation 900). The process places a set of embedded reinforcement element models within the set of component models for the set of components in the composite structure to form a composite structure model for the composite structure (operation 902). In operation 902, the set of component models and the set of embedded reinforcement element models form a composite structure model for the composite structure. The set of embedded reinforcement element models is for a set of embedded reinforcements embedded within the set of components in the composite structure.

The process performs a structural analysis of the composite structure using the composite structure model formed by the set of component models and the set of embedded reinforcement element models (operation 904). The process terminates thereafter. The set of embedded reinforcement element models enables modeling at least one of a deformation or a failure of embedded reinforcements.

Figure 10:
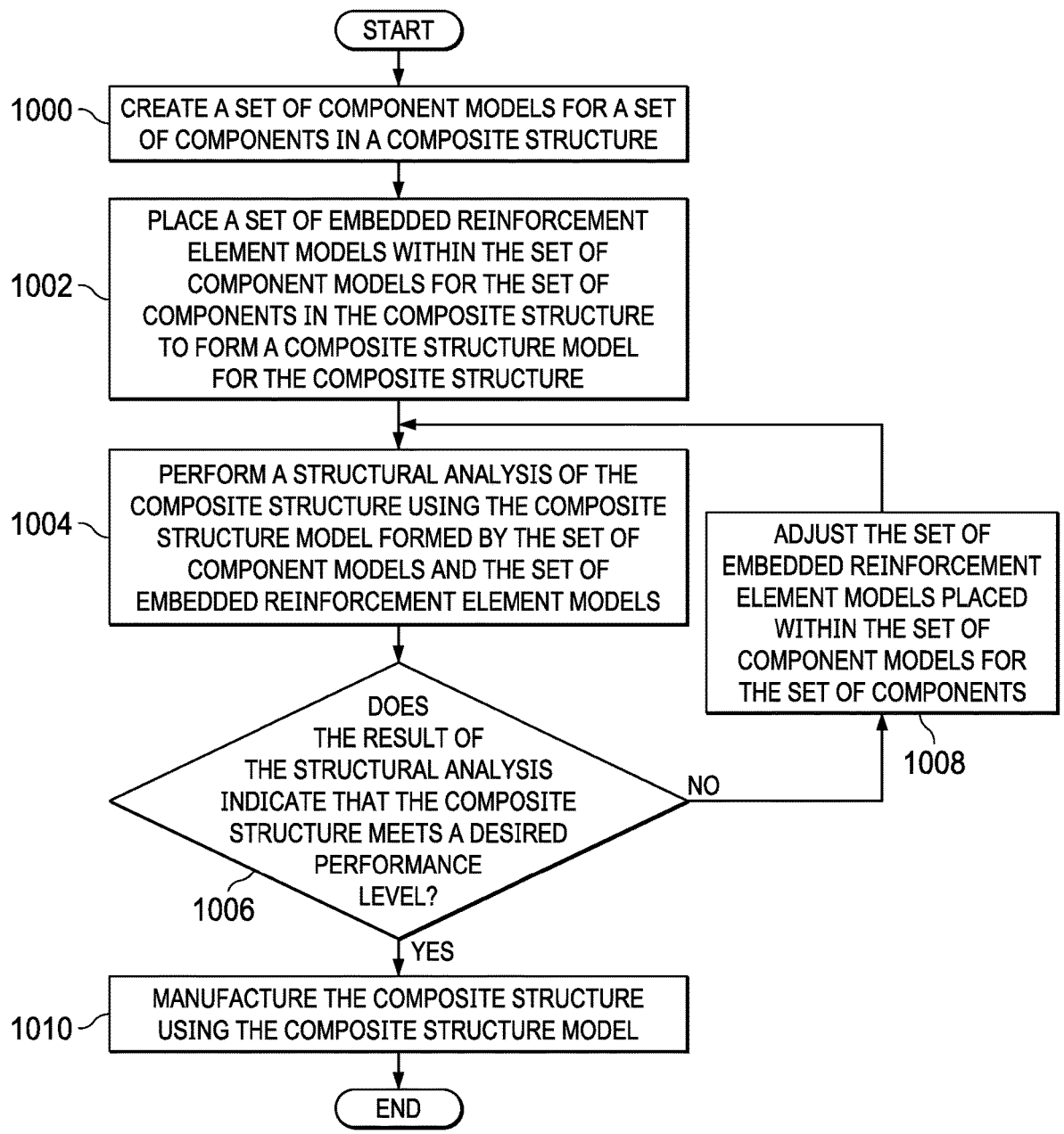
FIG. 10 is an illustration of another flowchart of a process for managing a composite structure in accordance with an illustrative embodiment.

With reference to FIG. 10, an illustration of another flowchart of a process for managing a composite structure is depicted in accordance with an illustrative embodiment. The process in FIG. 10 can be implemented in hardware, software, or both. When implemented in software, the process can take the form of program code that is run by one of more processor units located in one or more hardware devices in one or more computer systems. For example, the process can be implemented in composite structure manager 126 in computer system 128 in FIG. 1.

The process beings by creating a set of component models for a set of components in a composite structure (operation 1000). In this illustrative example, the set of component models can be created from a model of the composite structure. Operation 1000 can be performed using processes of functionality already present in at least one of currently available computer-aided design software or currently available finite element analysis software.

In operation 1000, a mesh of the composite structure is created. The mesh comprises elements that form the shape of the composite structure.

The process places a set of embedded reinforcement element models within the set of component models for the set of components in the composite structure to form a composite structure model for the composite structure (operation 1002). In this illustrative example, operation 1002 can be performed by creating subroutines that work with currently available finite element analysis software. In other words, an embedded reinforcement element model that describes the behavior of an embedded reinforcement in response to the application of one or more structural loads can be implemented in a subroutine that will work with a finite element analysis software, such as a native finite element (FE) solver used to implement finite element analysis process 151 in FIG. 1 from examples of currently available finite element analysis software described above.

The embedded reinforcement element model can be placed in the mesh generated in operation 1000 using a scripting language, such as Python. The scripting language can be used to define where and how reinforcement element models are inserted into the mesh forming the model of the components for the composite structure. This process results in reinforcement elements being placed into the mesh of elements for the composite structure.

In operation 1002, the set of component models and the set of embedded reinforcement element models form a composite structure model for the composite structure. The process performs a structural analysis of the composite structure using the composite structure model formed by the set of component models and the set of embedded reinforcement element models (operation 1004). The set of embedded reinforcement element models enables modeling at least one of a deformation or a failure of embedded reinforcements.

A determination is made as to whether the result of the structural analysis indicates that the composite structure meets a desired performance level (operation 1006). If the result of the structural analysis indicates that the composite structure does not meet a desired performance level, the process adjusts the set of embedded reinforcement element models placed within the set of component models for the set of components (operation 1008).

In operation 1008, the adjustment can be made through user input received from a human operator using a human machine interface. In another illustrative example, the adjustment can be received from an artificial intelligence system that has been trained to place embedded reinforcement element models within component models for the composite structure being designed. The process then returns to operation 1004.

With reference again to operation 1008, if the result of the structural analysis indicates that the composite structure does meet a desired performance level, the process proceeds to manufacture the composite structure using the composite structure model (operation 1010). The process terminates thereafter.

Figure 11:
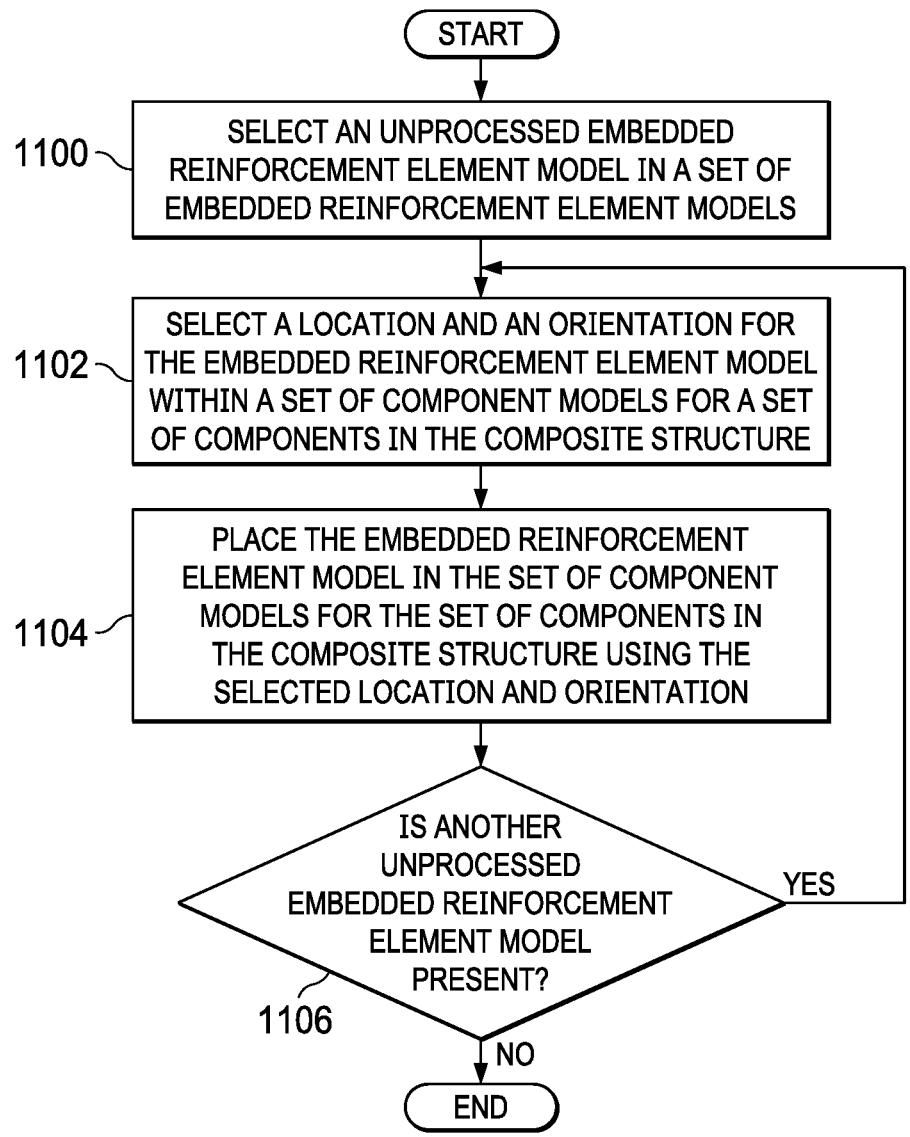
FIG. 11 is an illustration of a flowchart of a process for placing a set of embedded reinforcement element models in accordance with an illustrative embodiment.

With reference to FIG. 11, an illustration of a flowchart of a process for placing a set of embedded reinforcement element models is depicted in accordance with an illustrative embodiment. FIG. 11 is an example of one implementation for operation 902 in FIG. 9.

The process beings by selecting an unprocessed embedded reinforcement element model in a set of embedded reinforcement element models (operation 1100). The process selects a location and an orientation for the embedded reinforcement element model within a set of component models for a set of components in the composite structure (operation 1102). The process places the embedded reinforcement element model in the set of component models for the set of components in the composite structure using the selected location and orientation (operation 1104).

The process determines whether another unprocessed embedded reinforcement element model is present (operation 1106). If another unprocessed embedded reinforcement element model is present, the process returns to operation 1102. Otherwise, the process terminates. At this point, the composite structure model for the composite structure comprises the set of embedded reinforcement element models placed in the set of component models for the set of components in the composite structure.

Figure 12:
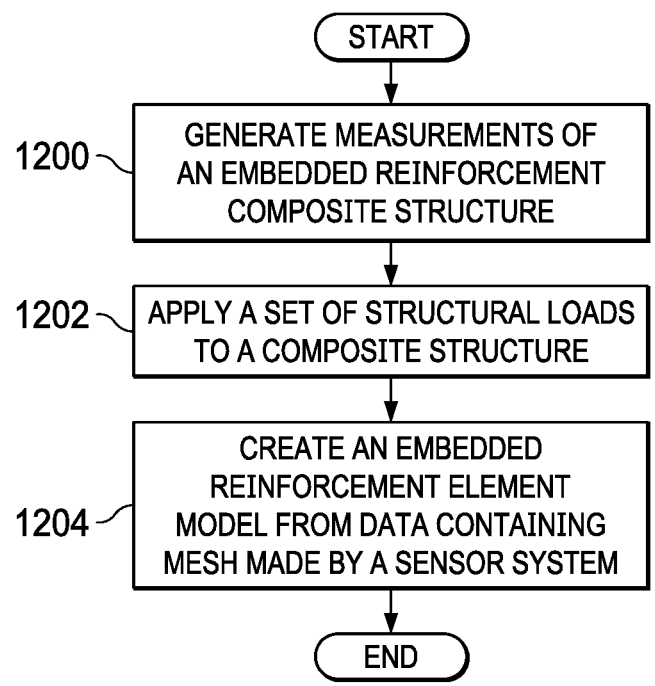
FIG. 12 is an illustration of a flowchart of a process for creating an embedded reinforcement element model in accordance with an illustrative embodiment.

With reference next to FIG. 12, an illustration of a flowchart of a process for creating an embedded reinforcement element model is depicted in accordance with an illustrative embodiment. The process in FIG. 12 can be implemented in hardware, software, or both. When implemented in software, the process can take the form of program code that is run by one of more processor units located in one or more hardware devices in one or more computer systems. For example, the process can be implemented in composite structure manager 126 in computer system 128 in FIG. 1. This process in FIG. 12 can be used to create an embedded reinforcement element model that models a response to a set of structural loads applied to an embedded reinforcement that represented by the embedded reinforcement element model.

The process begins by generating measurements of an embedded reinforcement composite structure (operation 1200). The measurements generated in operation 1200 are data reviews in generating an embedded reinforcement element model of the embedded reinforcement.

The process applies a set of structural loads to a composite structure (operation 1202). This operation occurs while measurements are generated as described in operation 1200. In operation 1202, a set of structural loads are applied such that at least one of a deformation or a failure of embedded reinforcement occurs while the sensor system generates the measurements.

The process creates an embedded reinforcement element model from data containing a mesh made by a sensor system (operation 1204). The process terminates thereafter. The embedded reinforcement element model enables modeling at least one of a deformation or a failure of the embedded reinforcement.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
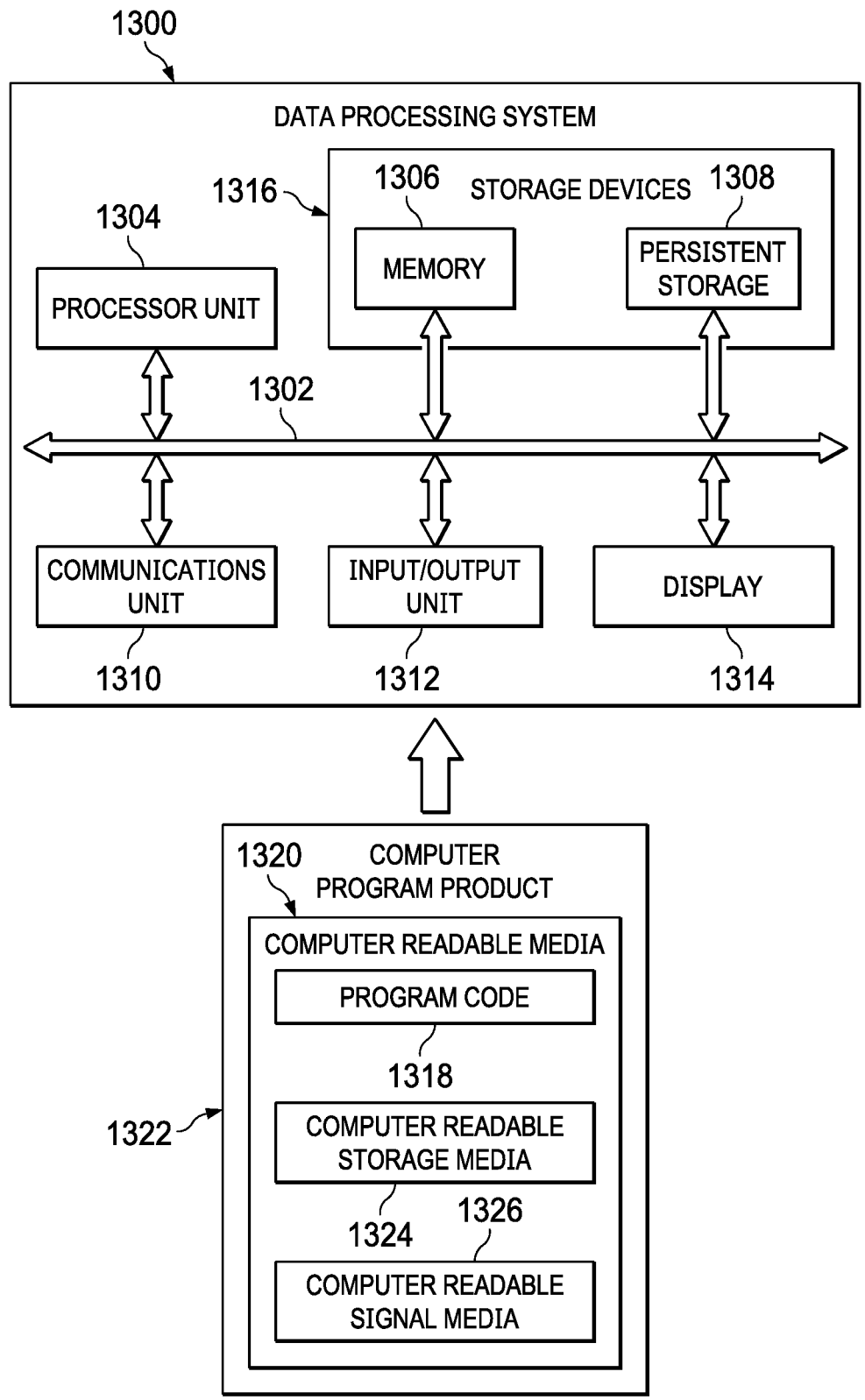
FIG. 13 is an illustration of a block diagram of a data processing system in accordance with an illustrative embodiment.

Turning now to FIG. 13, an illustration of a block diagram of a data processing system is depicted in accordance with an illustrative embodiment. Data processing system 1300 can be used to implement computer system 128 in FIG. 1.

In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 takes the form of a bus system.

Processor unit 1304 serves to execute instructions for software that can be loaded into memory 1306. Processor unit 1304 includes one or more processors. For example, processor unit 1304 can be selected from at least one of a multicore processor, a central processing unit (CPU), a graphics processing unit (GPU), a physics processing unit (PPU), a digital signal processor (DSP), a network processor, or some other suitable type of processor.

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, can be, for example, a random-access memory or any other suitable volatile or non-volatile storage device. Persistent storage 1308 can take various forms, depending on the particular implementation.

For example, persistent storage 1308 may contain one or more components or devices. For example, persistent storage 1308 can be a hard drive, a solid-state drive (SSD), a flash memory, a rewritable optical disk, a rewritable magnetic tape, or some combination of the above. The media used by persistent storage 1308 also can be removable. For example, a removable hard drive can be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that can be connected to data processing system 1300. For example, input/output unit 1312 can provide a connection for user input through at least one of a keyboard, a mouse, or some other suitable input device. Further, input/output unit 1312 can send output to a printer. Display 1314 provides a mechanism to display information to a user.

Instructions for at least one of the operating system, applications, or programs can be located in storage devices 1316, which are in communication with processor unit 1304 through communications framework 1302. The processes of the different embodiments can be performed by processor unit 1304 using computer-implemented instructions, which can be located in a memory, such as memory 1306.

These instructions are referred to as program code, computer usable program code, or computer-readable program code that can be read and executed by a processor in processor unit 1304. The program code in the different embodiments can be embodied on different physical or computer-readable storage media, such as memory 1306 or persistent storage 1308.

Program code 1318 is located in a functional form on computer-readable media 1320 that is selectively removable and can be loaded onto or transferred to data processing system 1300 for execution by processor unit 1304. Program code 1318 and computer-readable media 1320 form computer program product 1322 in these illustrative examples. In the illustrative example, computer-readable media 1320 is computer-readable storage media 1324.

In these illustrative examples, computer-readable storage media 1324 is a physical or tangible storage device used to store program code 1318 rather than a medium that propagates or transmits program code 1318.

Alternatively, program code 1318 can be transferred to data processing system 1300 using a computer-readable signal media 1326. The computer-readable signal media 1326 can be, for example, a propagated data signal containing program code 1318. For example, the computer-readable signal media 1326 can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1300 are not meant to provide architectural limitations to the manner in which different embodiments can be implemented. In some illustrative examples, one or more of the components may be incorporated in or otherwise form a portion of, another component. For example, memory 1306, or portions thereof, can be incorporated in processor unit 1304 in some illustrative examples. The different illustrative embodiments can be implemented in a data processing system including components in addition to or in place of those illustrated for data processing system 1300. Other components shown in FIG. 13 can be varied from the illustrative examples shown. The different embodiments can be implemented using any hardware device or system capable of running program code 1318.

Figure 14:
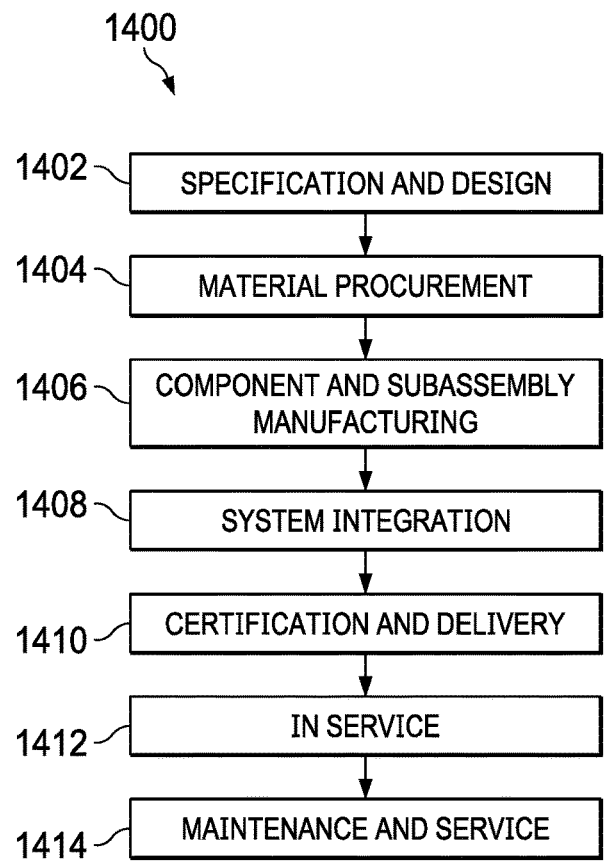
FIG. 14 is an illustration of an aircraft manufacturing and service method in accordance with an illustrative embodiment.
Figure 15:
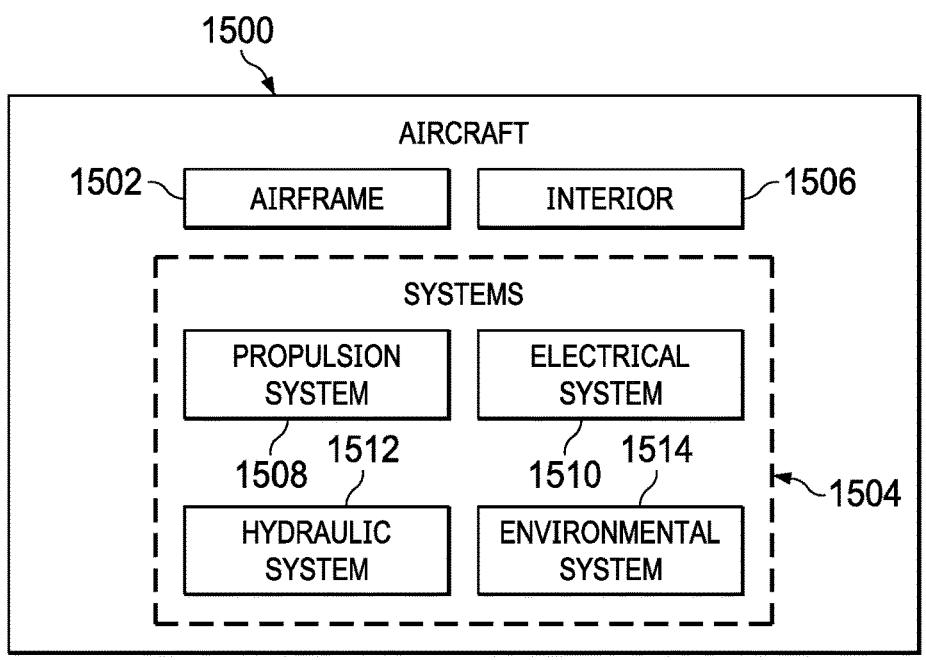
FIG. 15 is an illustration of a block diagram of an aircraft in which an illustrative embodiment may be implemented.

Illustrative embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During preproduction, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 can go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. For example, composite structure manager 126 in FIG. 1 can be used during specification and design 1402 to manage designs for composite structures to identify designs that produce composite structures meeting desired performance levels. Further, composite structure manager 126 can be used during maintenance and service 1414 do produce designs for composite structures used in routine maintenance, modification, reconfiguration, refurbishment, and other maintenance or service of aircraft 1500.

In one illustrative example, components or subassemblies produced in component and subassembly manufacturing 1406 in FIG. 14 can be fabricated or manufactured in a manner similar to components or subassemblies produced while aircraft 1500 is in service 1412 in FIG. 14. As yet another example, one or more apparatus embodiments, method embodiments, or a combination thereof can be utilized during production stages, such as component and subassembly manufacturing 1406 and system integration 1408 in FIG. 14. One or more apparatus embodiments, method embodiments, or a combination thereof may be utilized while aircraft 1500 is in service 1412, during maintenance and service 1414 in FIG. 14, or both. The use of a number of the different illustrative embodiments may substantially expedite the assembly of aircraft 1500, reduce the cost of aircraft 1500, or both expedite the assembly of aircraft 1500 and reduce the cost of aircraft 1500.

Figure 16:
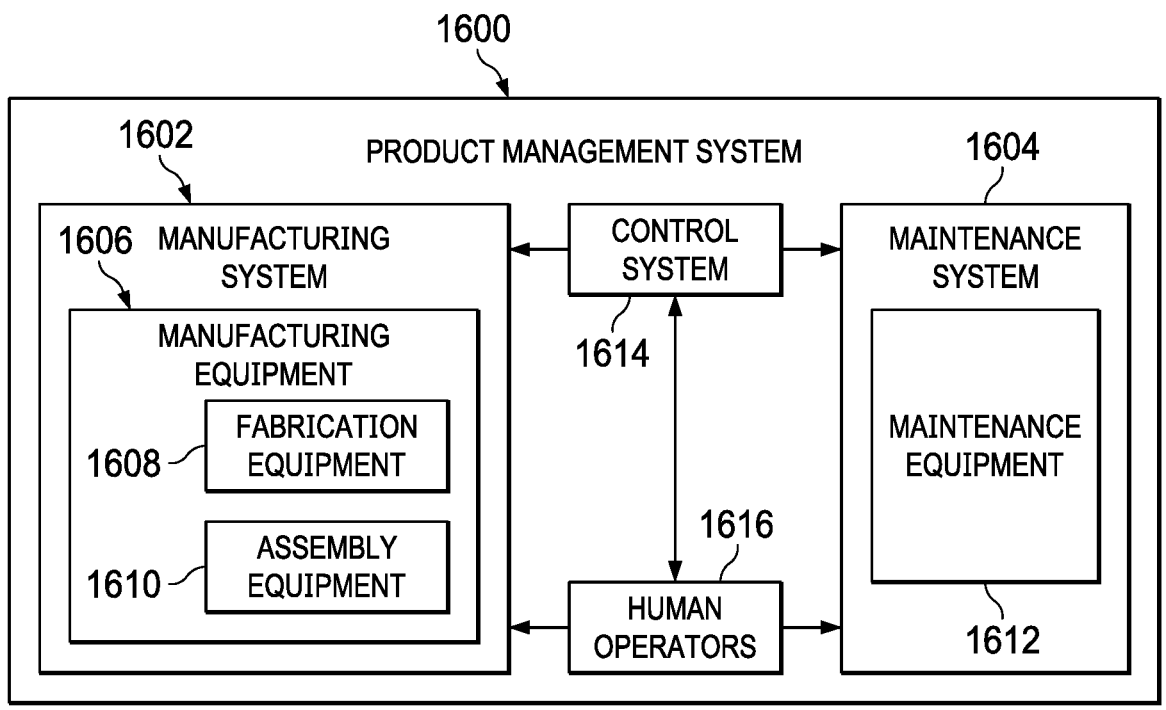
FIG. 16 is an illustration of a block diagram of a product management system in accordance with an illustrative embodiment.

Turning now to FIG. 16, an illustration of a block diagram of a product management system is depicted in accordance with an illustrative embodiment. Product management system 1600 is a physical hardware system and is an example of an implementation for product management system 154 in FIG. 1. In this illustrative example, product management system 1600 includes at least one of manufacturing system 1602 or maintenance system 1604.

Manufacturing system 1602 is configured to manufacture products, such as aircraft 1500 in FIG. 15. As depicted, manufacturing system 1602 includes manufacturing equipment 1606. Manufacturing equipment 1606 includes at least one of fabrication equipment 1608 or assembly equipment 1610.

Fabrication equipment 1608 is equipment that used to fabricate components for parts used to form aircraft 1500 in FIG. 15. For example, fabrication equipment 1608 can include machines and tools. These machines and tools can be at least one of a drill, a hydraulic press, a furnace, a mold, a composite tape laying machine, a vacuum system, a lathe, or other suitable types of equipment. Fabrication equipment 1608 can be used to fabricate at least one of metal parts, composite parts, semiconductors, circuits, fasteners, ribs, skin panels, spars, antennas, or other suitable types of parts.

Assembly equipment 1610 is equipment used to assemble parts to form aircraft 1500 in FIG. 15. In particular, assembly equipment 1610 is used to assemble components and parts to form aircraft 1500 in FIG. 15. Assembly equipment 1610 also can include machines and tools. These machines and tools may be at least one of a robotic arm, a crawler, a faster installation system, a rail-based drilling system, or a robot. Assembly equipment 1610 can be used to assemble parts such as seats, horizontal stabilizers, wings, engines, engine housings, landing gear systems, and other parts for aircraft 1500 in FIG. 15.

In this illustrative example, maintenance system 1604 includes maintenance equipment 1612. Maintenance equipment 1612 can include any equipment needed to perform maintenance on aircraft 1500 in FIG. 15. Maintenance equipment 1612 may include tools for performing different operations on parts on aircraft 1500 in FIG. 15. These operations can include at least one of disassembling parts, refurbishing parts, inspecting parts, reworking parts, manufacturing replacement parts, or other operations for performing maintenance on aircraft 1500 in FIG. 15. These operations can be for routine maintenance, inspections, upgrades, refurbishment, or other types of maintenance operations.

In the illustrative example, maintenance equipment 1612 may include ultrasonic inspection devices, x-ray imaging systems, vision systems, drills, crawlers, and other suitable devices. In some cases, maintenance equipment 1612 can include fabrication equipment 1608, assembly equipment 1610, or both to produce and assemble parts that needed for maintenance.

Product management system 1600 also includes control system 1614. In this illustrative example, control system 1614 can include controller 156 in FIG. 1. In this illustrative example, controller 156 can receive composite part design. This design can be, for example, at least one of composite structure model 132 or computer-aided design model 110 of composite structure 102 in FIG. 1. This design can be used by controller 156 to control the operation of fabrication equipment 1508 to manufacture composite structure 102. In this illustrative example, fabrication equipment 1508 can include, for example, a ply layup system and a curing system.

Control system 1614 is a hardware system and may also include software or other types of components. Control system 1614 is configured to control the operation of at least one of manufacturing system 1602 or maintenance system 1604. In particular, control system 1614 can control the operation of at least one of fabrication equipment 1608, assembly equipment 1610, or maintenance equipment 1612.

The hardware in control system 1614 can be implemented using hardware that may include computers, circuits, networks, and other types of equipment. The control may take the form of direct control of manufacturing equipment 1606. For example, robots, computer-controlled machines, and other equipment can be controlled by control system 1614. In other illustrative examples, control system 1614 can manage operations performed by human operators 1616 in manufacturing or performing maintenance on aircraft 1500. For example, control system 1614 can assign tasks, provide instructions, display models, or perform other operations to manage operations performed by human operators 1616. In these illustrative examples, controller 156 in FIG. 1 can be implemented in control system 1614 to manage at least one of the manufacturing or maintenance of aircraft 1500 in FIG. 15. For example, controller 156 and operate to control at least one of fabrication equipment 1608 or maintenance equipment 1612 to manufacture composite structures from computer-aided design models or composite structure models of the composite structures.

In the different illustrative examples, human operators 1616 can operate or interact with at least one of manufacturing equipment 1606, maintenance equipment 1612, or control system 1614. This interaction can occur to manufacture aircraft 1500 in FIG. 15.

Of course, product management system 1600 may be configured to manage other products other than aircraft 1500 in FIG. 15. Although product management system 1600 has been described with respect to manufacturing in the aerospace industry, product management system 1600 can be configured to manage products for other industries. For example, product management system 1600 can be configured to manufacture products for the automotive industry as well as any other suitable industries.

Thus, one or more of the illustrative examples overcome a technical problem with designing composite aircraft structures. One or more illustrative examples enable analyzing of designs of composite structures containing embedded reinforcements more quickly and efficiently as compared to current techniques. The illustrative example enables reducing the need to produce prototypes of the composite structures for structural load testing through improved models for analyzing composite structures using structural analysis.

The embedded reinforcement element models model a response to a set of structural loads with a desired level of accuracy. Further, the models are implemented and placed in the component models such that processing resources in a computer system can be reduced to perform a structural analysis using a finite element analysis process.

Thus, one or more illustrative examples can be used to analyze a model of a composite structure for purposes of manufacturing the composite structure or certification of the composite structure for use in vehicles such as aircraft, trains, automobiles, or other suitable vehicles. Additionally, one or more illustrative examples perform analysis for other purposes such as design trade studies, manufacturability studies, and other suitable uses.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. A composite structure management system comprising:
a computer system; and a composite structure manager in the computer system, wherein during operation of the composite structure manager, the composite structure manager operates to:
create a set of component models for a set of components in a composite structure;
place a set of embedded reinforcement element models within the set of component models for the set of components in the composite structure, wherein the set of component models and the set of embedded reinforcement element models form a composite structure model for the composite structure, wherein the set of embedded reinforcement element models is for a set of embedded reinforcements embedded within the set of components in the composite structure, wherein the set of embedded reinforcements are embedded totally within the set of components in the composite structure and not visible outside the composite structure, and wherein the set of embedded reinforcement element models a response to a set of structural loads; and
perform a finite element analysis on the composite structure using the composite structure model formed by the set of component models and the set of embedded reinforcement element models.

2. The composite structure management system of claim 1, wherein the set of embedded reinforcement element models enables modeling at least one of a deformation or a failure of the set of embedded reinforcements.

3. The composite structure management system of claim 1, wherein during operation of the composite structure manager, the composite structure manager operates to:
create the set of component models for the set of components in the composite structure; and
place the set of embedded reinforcement element models within the set of component models for the set of components in the composite structure to form the composite structure model for the composite structure, wherein the set of embedded reinforcement element models is for the set of embedded reinforcements embedded within the set of components in the composite structure are performed in response to user input generated a human operator interacting with a graphical user interface with an input system.

4. The composite structure management system of claim 1, wherein in placing the set of embedded reinforcement element models within the set of component models for the set of components in the composite structure to form the composite structure model for the composite structure, the composite structure manager operates to:
select a location and an orientation for each of the set of embedded reinforcement element models within the set of component models for the set of components in the composite structure to form the composite structure model for the composite structure.

5. The composite structure management system of claim 1, further comprising:
a product management system, wherein during operation of the product management system, the product management system manufactures the composite structure using the composite structure model when a result of the finite element analysis indicates that the composite structure meets a desired performance level.

6. The composite structure management system of claim 1, during operation of the composite structure manager, the composite structure manager operates to:
adjust the set of embedded reinforcement element models placed within the set of component models for the set of components when a result of the finite element analysis indicates that the composite structure does not meet a desired performance level.

7. The composite structure management system of claim 1, wherein during operation of the composite structure manager, the composite structure manager operates to:
receive data from a sensor system, wherein the data is generated by the sensor system detecting the set of structural loads applied to an embedded reinforcement, wherein the set of structural loads are such that at least one of a deformation or a failure of the embedded reinforcement occurs while applying the set of structural loads to the embedded reinforcement and is captured in the data generated by the sensor system; and
generate an embedded reinforcement element model for the embedded reinforcement in the set of embedded reinforcement element models, wherein the embedded reinforcement element model models at least one of the deformation or the failure of the embedded reinforcement.

8. The composite structure management system of claim 7, wherein the data is a computed tomography scan.

9. The composite structure management system of claim 7, wherein the sensor system is selected from at least one of a computed tomography scanner, an electron-beam computed tomography scanner, in situ x-ray computed tomography scanner, a time-lapse x-ray computed tomography scanner, a continuous streaming x-ray computed tomography scanner, a positron emission tomography scanner, or a single photo emission computer tomography scanner.

10. The composite structure management system of claim 1, wherein the set of embedded reinforcements is selected from at least one of a z-axis reinforcement, a stitch, a pin, or a fastener.

11. The composite structure management system of claim 1, wherein the composite structure comprises a skin panel and a number of stringers and wherein the set of component models for the composite structure comprises a number of stringer models for the number of stringers and a skin panel model of the skin panel.

12. The composite structure management system of claim 1, wherein the composite structure is for a product selected from one of a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, and a building.

13. A composite structure management system comprising:
a computer system configured to:
create a set of component models for a set of components in a composite structure;
place a set of embedded reinforcement element models within the set of component models for the set of components in the composite structure, wherein the set of component models and the set of embedded reinforcement element models form a composite structure model for the composite structure and wherein the set of embedded reinforcement element models is for a set of embedded reinforcements embedded within the set of components in the composite structure, wherein the set of embedded reinforcements are embedded totally within the set of components in the composite structure and not visible outside the composite structure; and perform a structural analysis of the composite structure using the composite structure model formed by the set of component models and the set of embedded reinforcement element models.

14. The composite structure management system of claim 13, wherein the set of embedded reinforcement element models model a response to a set of structural loads applied to the set of embedded reinforcements.

15. The composite structure management system of claim 13, wherein the computer system is configured to adjust the set of embedded reinforcements placed within the set of component models for the set of components when a result of the structural analysis indicates that the composite structure does not meet a desired performance level.

16. The composite structure management system of claim 13, wherein the computer system is configured to:
  receive data from a sensor system, wherein the data is generated by the sensor system detecting a set of structural loads applied to an embedded reinforcement, wherein the set of structural loads are such that at least one of a deformation or a failure of the embedded reinforcement occurs while applying the set of structural loads to the embedded reinforcement and is captured in the data generated by the sensor system; and
  generate an embedded reinforcement element model for the embedded reinforcement in the set of embedded reinforcement element models, wherein the embedded reinforcement element model models at least one of the deformation or the failure of the embedded reinforcement.

17. The composite structure management system of claim 13, wherein the structural analysis is performed using at least one of a finite element analysis, a static linear analysis, a dynamic linear analysis, a nonlinear static analysis, a buckling analysis, a P-delta analysis, or a time-history analysis.

18. A method for managing a composite structure, the method comprising:
  creating a set of component models for a set of components in the composite structure;
  placing a set of embedded reinforcement element models within the set of component models for the set of components in the composite structure to form a composite structure model for the composite structure and wherein the set of embedded reinforcement element models is for a set of embedded reinforcements embedded within the set of components in the composite structure, wherein the set of embedded reinforcements are embedded totally within the set of components in the composite structure and not visible outside the composite structure; and
  performing a structural analysis of the composite structure using the composite structure model formed by the set of component models and the set of embedded reinforcement element models, wherein the set of embedded reinforcement element models enables modeling at least one of a deformation or a failure of the set of embedded reinforcements.

19. The method of claim 18, wherein the set of embedded reinforcement element models model a response to a set of structural loads applied to the set of embedded reinforcements.

20. The method of claim 18, wherein creating the set of component models for the set of components in the composite structure and placing the set of embedded reinforcement element models within the set of component models for the set of components in the composite structure to form the composite structure model for the composite structure, wherein the set of embedded reinforcement element models is for the set of embedded reinforcements embedded within the set of components in the composite structure are performed in response to user input generated a human operator interacting with a graphical user interface with an input system.

21. The method of claim 18, wherein placing the set of embedded reinforcement element models within the set of component models for the set of components in the composite structure to form the composite structure model for the composite structure comprises:
  selecting a location and an orientation for each of the set of embedded reinforcement element models within the set of component models for the set of components in the composite structure to form the composite structure model for the composite structure.

22. The method of claim 18, further comprising:
  manufacturing the composite structure using the composite structure model when a result of the structural analysis indicates that the composite structure meets a desired performance level.

23. The method of claim 18, further comprising:
  adjusting the set of embedded reinforcement element models placed within the set of component models for the set of components when a result of the structural analysis indicates that the composite structure does not meet a desired performance level.

24. The method of claim 18, further comprising:
  generating, by a sensor system, data from detecting a set of structural loads applied to an embedded reinforcement, wherein the set of structural loads are such that at least one of the deformation or a failure of the embedded reinforcement occurs while applying the set of structural loads and is captured in the data generated by the sensor system; and
  creating an embedded reinforcement element model in the set of embedded reinforcement element models for the embedded reinforcement, wherein the embedded reinforcement element model models at least one of the deformation or the failure of the embedded reinforcement when the embedded reinforcement element model is used in the composite structure model.

25. The method of claim 24, wherein the data is a computed tomography scan.

26. The method of claim 24, wherein the sensor system is selected from at least one of a computed tomography scanner, an electron-beam computed tomography scanner, in situ x-ray computed tomography scanner, a time-lapse x-ray computed tomography scanner, a continuous streaming x-ray computed tomography scanner, a positron emission tomography scanner, or single photo emission computer tomography scanner.

27. The method of claim 18, wherein the set of embedded reinforcements is selected from at least one of a z-axis reinforcement, a stitch, a pin, or a fastener.

28. The method of claim 18, wherein the structural analysis is performed using at least one of a finite element analysis, a static linear analysis, a dynamic linear analysis, a nonlinear static analysis, a buckling analysis, a P-delta analysis, and a time-history analysis.

29. The method of claim 18, wherein the composite structure comprises a skin panel and a number of stringers and wherein the set of component models for the composite structure comprises a number of stringer models for the number of stringers and a skin panel model of the skin panel.

30. The method of claim 18, wherein the composite structure is for a product selected from one of a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, and a building.

* * * * *